(12) United States Patent
de Bien (10) Patent No.: US 9,370,165 B2
(45) Date of Patent: Jun. 21, 2016

(54) PET CRATE

(75) Inventor: Humberto de Bien, Titusville, FL (US)

(73) Assignee: Swiftipet, Inc., Titusville, FL (US)

( * ) Notice: Subject to any disclaimer, the term of this patent is extended or adjusted under 35 U.S.C. 154(b) by 544 days.

(21) Appl. No.: 13/427,327

(22) Filed: Mar. 22, 2012

(65) Prior Publication Data

US 2013/0247833 A1    Sep. 26, 2013

(51) Int. Cl.
  *A01K 1/03* (2006.01)
  *A01K 1/02* (2006.01)

(52) U.S. Cl.
  CPC .............. *A01K 1/0245* (2013.01); *A01K 1/034* (2013.01)

(58) Field of Classification Search
  CPC . A01K 1/0236; A01K 1/0245; A01K 1/0272; A01K 1/0281; A01K 1/029; A01K 1/034
  USPC ......... 119/416, 452, 453, 472, 473, 482, 496, 119/497; 220/326, 315, 324
  See application file for complete search history.

(56) References Cited

U.S. PATENT DOCUMENTS

| | | |
|---|---|---|
| 3,771,686 A | 11/1973 | Brison |
| 4,217,675 A | 8/1980 | Haft |
| 4,576,307 A | 3/1986 | Frydenberg |
| 4,615,464 A | 10/1986 | Byrns |
| 4,852,520 A | 8/1989 | Goetz |
| 5,220,885 A | 6/1993 | Goetz |
| 5,253,612 A * | 10/1993 | Goetz ........................... 119/496 |
| 5,280,767 A | 1/1994 | Goetz |
| 5,524,573 A | 6/1996 | Hart |
| 5,678,509 A * | 10/1997 | Dillon ............................ 119/496 |
| 5,701,843 A | 12/1997 | Lazides |
| 6,112,964 A * | 9/2000 | Cucheran et al. .............. 224/321 |
| 6,182,611 B1 | 2/2001 | Marchioro |
| 6,230,656 B1 | 5/2001 | Walach |
| 6,539,895 B2 | 4/2003 | Hoagland |
| 6,571,740 B1 | 6/2003 | Kinder et al. |
| 6,971,333 B1 * | 12/2005 | Hearrell ......................... 119/482 |
| 7,036,458 B1 | 5/2006 | Stornant |
| 7,913,651 B1 | 3/2011 | Schiebout |
| 2002/0092477 A1 * | 7/2002 | Ross .............................. 119/496 |
| 2008/0277438 A1 * | 11/2008 | Aftanas ......................... 224/325 |
| 2009/0223463 A1 * | 9/2009 | Chem ............................ 119/482 |
| 2010/0043720 A1 * | 2/2010 | Yelverton ..................... 119/496 |
| 2010/0192870 A1 * | 8/2010 | Wood ............................ 119/496 |
| 2012/0151975 A1 * | 6/2012 | Kottenstette .................... 70/167 |

* cited by examiner

*Primary Examiner* — Monica Williams
*Assistant Examiner* — Thien Thanh Pham
(74) *Attorney, Agent, or Firm* — Kelly G. Swartz; Widerman Malek, PL (57) ABSTRACT

An apparatus for housing an animal includes a top portion wherein an upper flange is disposed along the lower edge of the bottom portion. A locking member is movably mounted to the upper flange. The apparatus may also include a bottom portion wherein a lower flange is disposed along the upper bottom edge of the bottom portion. The locking member engages with the lower flange when the locking member is in the outwardly extending locking orientation, which is at least partially defined by the locking member structured to engage at least a portion of the lower flange in an abutting relation to prevent detachment of the bottom portion from the top portion while disposed in the outwardly extending locking orientation. The apparatus may include a biasing mechanism structured to normally dispose and maintain the locking member in the outwardly extending locking orientation.

18 Claims, 4 Drawing Sheets

PET CRATE

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention generally relates to an apparatus for housing an animal, more specifically, the present invention relates to an apparatus that can be easily assembled or disassembled and used for small animal transportation or housing.

2. Background Art

An area not currently addressed by pet crate manufacturers is the ability to quickly and easily assemble a pet crate while providing a safe pet confinement. In the majority of conventional or known crate assemblies, it is necessary for the pet owner to manually assemble a series of locking members while utilizing both hands. Crate assembly generally involves direct handling or manipulation of coupling structures including wing nut fasteners or snap type clips while balancing both crate halves and simultaneously assembling the door portion which is awkward and cumbersome because the top and bottom posts of the door must perfectly align with the holes on the top and bottom of the crate.

The most commonly used pet crate assemblies consist of a series of bolt and wing nut fasteners and snap type fasteners to secure two halves of the pet crate. The bolt and wing fasteners are the preferred industry standard for safety. However, there are numerous fasteners to install requiring precision while using both hands. The bolt and wing fasteners are cumbersome to assemble and the parts often get lost. Snap fasteners are also a bit cumbersome to use as the snap can be difficult to close or open and the snap frame will at times detach from the crate frame. Additionally, snap fasteners may become undone or break simply by bumping or dropping the crate. Halves of known pet crate assemblies may become detached due to movement or vibrations that may loosen the securing devices.

Additionally, plastic pet crates do not have the capability to easily confine two animals separately and safely within one crate.

The invention disclosed is intended to address these and other problems existing in the prior art.

BRIEF SUMMARY OF THE INVENTION

The present invention is directed to an apparatus for housing a small animal.

One embodiment of the invention may include two portions of the housing that may be secured together. The top portion of the apparatus may be connected to the bottom portion of the apparatus using a locking member. The top portion, bottom portion, or locking member may be structured so that the top portion and bottom portion automatically align with one another and the locking member secures the two portions together when the top portion is placed atop the bottom portion.

A biasing mechanism may be employed to normally dispose the locking member in an outwardly extending locking orientation. A release mechanism may be activated to temporarily dispose the locking member in an inwardly retracted release orientation. Additionally, the locking member may be automatically temporarily disposed in an inwardly retracted release orientation when the top portion is placed atop the bottom portion. The weight of the top portion may cause the top portion to securely mate to the bottom portion. After the two portions are securely mated, the biasing mechanism may cause the locking member to return to the outwardly extending locking orientation.

A release mechanism cover may be included to prevent the locking member from being actuated or placed in the inwardly retracted release orientation. The release mechanism cover may either physically prevent the release mechanism from being accessed or it may prevent the locking member from moving out of position.

The apparatus may include a removable partition that may be installed within the housing to separate the interior of the housing into two different compartments. The removable partition may have either a vertical or horizontal configuration.

The apparatus may include a modular door that may be disposed within a door frame. The door frame may be securely captured by the structure of the top portion and the bottom portion of the apparatus. Additionally, a doorstop may be included on the door frame. The doorstop may prevent the modular door from swinging into the housing and assist in positioning the door so that it may be easily, safely, and quickly secured.

The apparatus may include wheels that may retract. The wheels may be positioned to make contact with the ground when it is desirable for the apparatus to roll. The wheels may be positioned in a recess in the apparatus when it is desirable that the apparatus remain stationary or not roll.

The apparatus may include a feature that allows multiple apparatus to be securely stacked atop one another. An example of one such feature includes a structure that protrudes from the bottom of the apparatus and is capable of being securely captured by a corresponding structure on the top of the apparatus.

The apparatus may include a handle to facilitate moving the apparatus. The handle may be fixedly attached to the apparatus. Additionally, the handle may be retractable, allowing the handle to be stored in a minimized configuration when not in use. The handle may adjust in length and the angle between the handle and the housing may be adjustable to provide utility and comfort when utilizing the handle.

The apparatus may also include desirable features including a device for recording and playing back sound or a GPS enabled device.

BRIEF DESCRIPTION OF THE DRAWINGS

A better understanding of the present invention will be realized from the detailed description that follows, taken in conjunction with the accompanying drawings, in which.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

Figure 1:
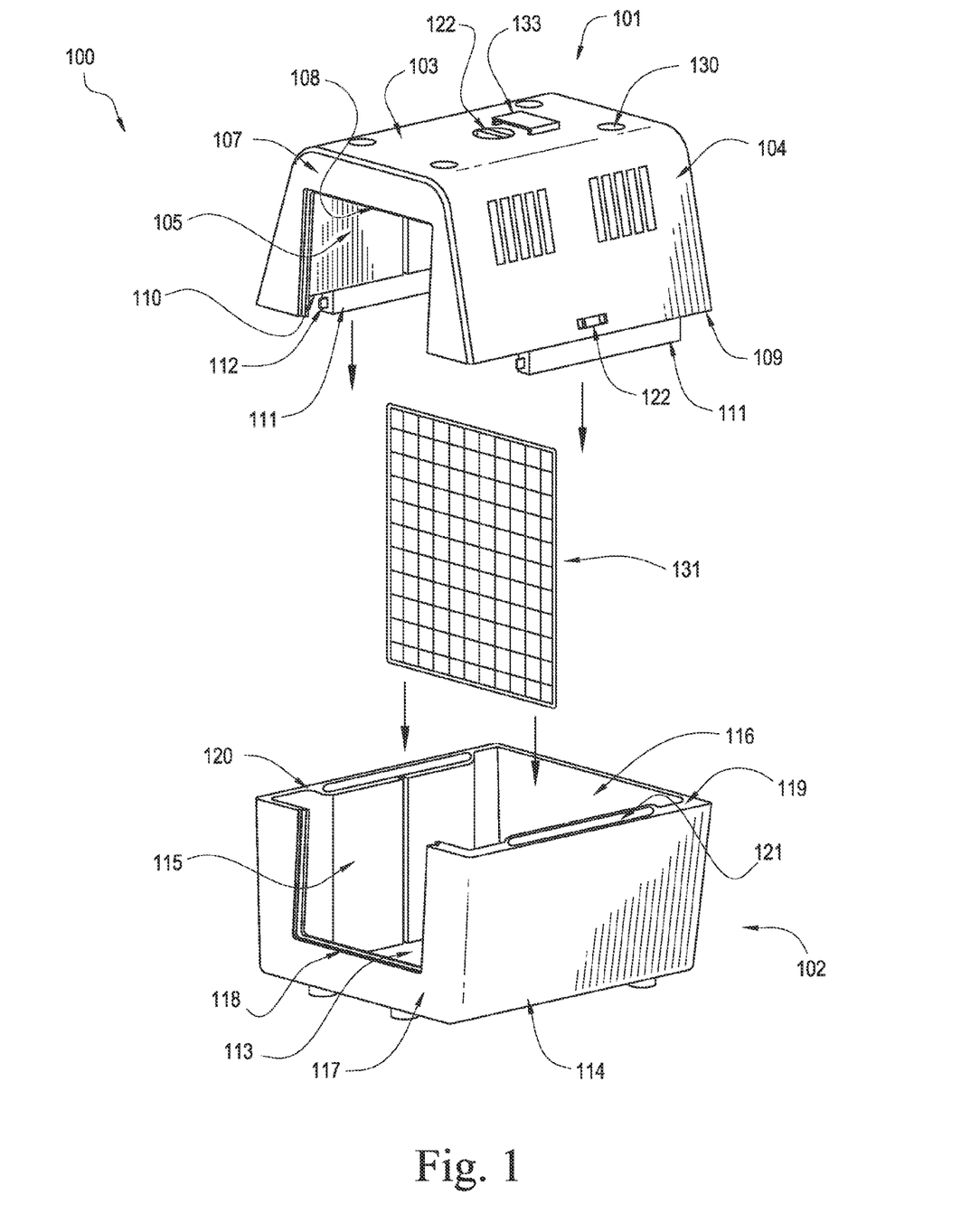
FIG. 1 depicts one possible embodiment of the apparatus.

One embodiment of the pet crate 100 is depicted in FIG. 1. In this embodiment of the pet crate 100, the top portion 101 and the bottom portion 102 may be secured together to form a structure that provides temporary housing for a small animal.

The top portion 101 or the bottom portion 102 may be constructed with double walls for added strength, stability, or insulation. The top portion 101 or the bottom portion 102 may be a lightweight, plastic construction and may include openings for ventilation. The top portion 101 and the bottom portion 102 may be a carbon fiber, wood, metal, or the like construction. One skilled in the art will appreciate that the specific examples of construction materials are provided by way of example only and are not limiting.

The top portion 101 may be constructed from a top roof wall 103, a top right wall 104, a top left wall 105, a top rear wall, and a top forward wall 107 with a top portion forward opening formed therein 108. Those skilled in the art will appreciate that the top portion forward opening 108 may be placed in any wall of the top portion 101. The location of the top portion forward opening 108 in the top forward wall 107 is provided for illustration and clarity and is not limiting. It is not necessary that there be an opening in the top portion 101. In some embodiments, there may be no opening in the top portion 101. In alternate embodiments, there may be an opening in a plurality of walls in the top portion 101.

Each top wall has a lower wall edge. FIG. 1 depicts each lower wall edge, including a lower top right wall edge 109, a lower top left wall edge 110, a lower top rear wall edge, and a lower top forward wall edge. An upper flange 111 may be disposed on the lower top right wall edge 109, the lower top left wall edge 110, the lower top rear wall edge, or the lower top forward wall edge. Additionally, the upper flange 111 may disposed on any combination of lower edges of the walls of the top portion 101. The upper flange 111 may be a separate structure physically connected to the top portion 101. In an alternate embodiment, the upper flange 111 may be integrated into the top portion 101. In yet another embodiment, the upper flange 111 may simply be an area on the lower portion of a plurality of top walls and may not be visually distinct from other portions of the top walls.

A locking member 112 may be movably mounted to the upper flange 111. As shown in FIG. 1, the locking member 112 may be normally disposed in an outwardly extending locking orientation. The locking member 112 may be mechanically connected to a release mechanism 122. The release mechanism 122 may be actuated or manipulated to move the locking member 112 from or to an outwardly extending locking orientation. The release mechanism 122 may be actuated or manipulated to move the locking member 112 from or to and inwardly retracted release orientation. The release mechanism 122 may connect to the locking member 112 through a plurality of cables. The cables connecting the release mechanism 122 and the locking member 112 may be plastic coated steel cables, push and pull coated cables, plastic members, rigid bodies, or the like. The material that may be used to construct the plurality of cables is provided for clarity and illustration only and is not limiting. The plurality of cables may be any device that is rigid or allows the release mechanism 122 to mechanically connect to and move the locking member 112. The release mechanism 122 may be rotatable connected to the top portion 101. The release mechanism 122 may be mechanically connected to the locking member 112 through a plurality of cables. The release mechanism 122 and the cables may be structured and attached to one another so that rotational movement of the release mechanism 122 translates to lateral movement of the cables. The lateral movement of the cables may cause the locking member 112 to move between an outwardly extending locking configuration and an inwardly retracted release configuration. In an alternate embodiment, the release mechanism 122 may be actuated by pulling, pushing, or the like. Those skilled in the art will appreciate that the above description of a actuating the locking member is provided for clarity and illustration only and is not limiting.

The bottom portion 102 may include a bottom floor wall 113, a bottom right wall 114, a bottom left wall 115, a bottom rear wall 116, and a bottom forward wall 117 with a bottom portion forward opening formed therein 118. Those skilled in the art will appreciate that the bottom portion forward opening 118 may be placed in any wall of the bottom portion 102. The location of the bottom portion forward opening 118 in the bottom forward wall 117 is provided for illustration and clarity and is not limiting. It is not necessary that there be an opening in the bottom portion 102. In some embodiments, there may be no opening in the bottom portion 102. In alternate embodiments, there may be an opening in a plurality of walls in the bottom portion 102. Each bottom wall has an upper wall edge. FIG. 1 depicts each upper wall edge, including an upper bottom right wall edge 119, an upper bottom left wall edge 120, an upper bottom rear wall edge, and an upper bottom forward wall edge. A lower flange 121 may be disposed on the upper bottom right wall edge 119, the upper bottom left wall edge 120, the upper bottom rear wall edge, or the upper bottom forward wall edge. The locking member 112 may be disposed on the top portion 101 and engage with the lower flange 121 to secure the top portion 101 and bottom portion 102 in a securely connected configuration. Additionally, the lower flange 121 may disposed on any combination of upper edges of the walls of the bottom portion 102. The lower flange 121 may be a separate structure physically connected to the bottom portion 102. In an alternate embodiment, the lower flange 121 may be integrated into the bottom portion 102. In yet another embodiment, the lower flange 121 may simply be an area on the upper portion of a plurality of bottom walls and may not be visually distinct from other portions of the bottom walls.

In an alternate embodiment, the locking member 112 may be disposed on the bottom portion 102. In such an embodiment, the release mechanism 122 may be disposed on the bottom portion 102 and cables connecting the release mechanism 122 and the locking member 112 may also be disposed on the bottom portion 102.

The top portion 101 and the bottom portion 102 may be cooperatively structured to assume an aligned orientation.

This means that when the top portion 101 is placed atop the bottom portion 102 the two parts may be automatically positioned into an orientation in which the locking member 112 may engage with the lower flange 121. In the aligned orientation, the top portion 101 and the bottom portion 102 may be secured together. The physical structure of the top portion 101, the bottom portion 102, or the locking member may force the two portions to mate in an alignment that allows the locking member 112 to engage with the lower flange 121. Additionally a portion of the upper flange 111 and the lower flange 121 may be connected together to allow the two portions to mate in alignment. Examples of structures that may facilitate automatic alignment or mating of the top portion 101 and the bottom portion 102 include, but are not limited to, channel tracks, guideposts, guide receptacles, hinges, or the like. Those skilled in the art will appreciate that these alignment devices are provided as examples for clarity and illustration and are not limiting.

The locking member 112 may be structured to engage at least a portion of the lower flange 121 in an abutting relation to prevent detachment of the bottom portion 102 from the top portion 101 while the locking member 112 is disposed in the outwardly extending locking orientation. In an alternate embodiment, the locking member 112 may be structured to engage at least a portion of the upper flange 111 in an abutting relation to prevent detachment of the bottom portion 102 from the top portion 101 while the locking member 112 is disposed in the outwardly extending locking orientation. In a preferred embodiment of the invention, the locking member 112 may include a male feature that mates with a female feature included on the abutting flange. When the male feature and the female feature mate, the top portion 101 and the bottom portion 102 may be secured together.

Figure 5A:
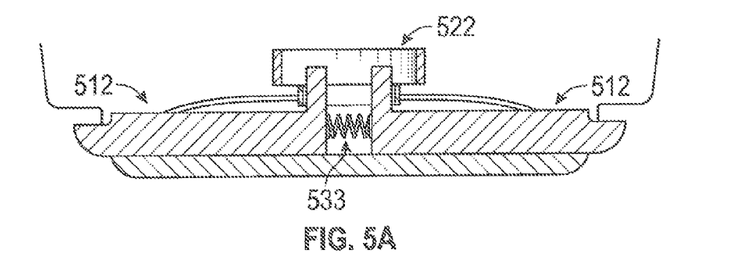
FIG. 5A depicts a cross section of the locking members and release mechanism.
Figure 5B:
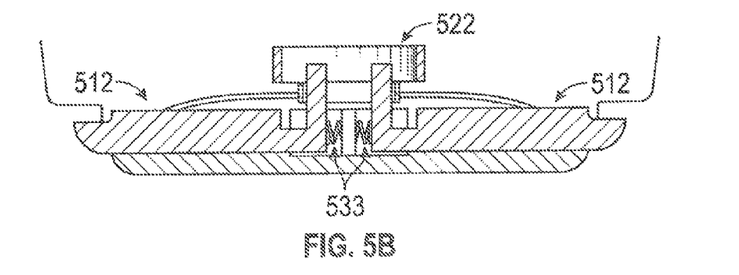
FIG. 5B depicts a cross section of an alternate embodiment of the locking members and release mechanism.
Figure 5C:
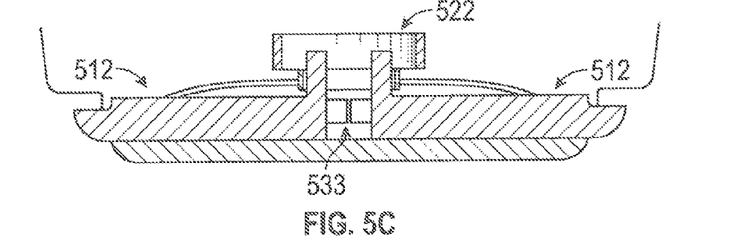
FIG. 5C depicts a cross section of another alternate embodiment of the locking members and release mechanism.
Figure 6:
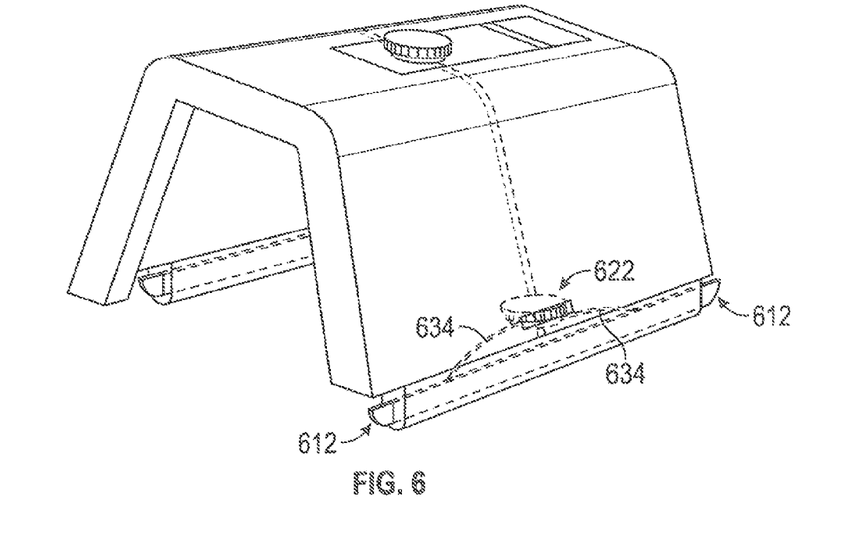
FIG. 6 depicts a possible embodiment of the top portion of the apparatus.

As depicted in FIGS. 5a, 5b and 5c, a biasing mechanism 533 may influence the position of the locking member 512. The biasing mechanism 533 may be structured to normally dispose and maintain the locking member 512 in the outwardly extending locking orientation. In a preferred embodiment, the biasing mechanism 533 may be a spring, a magnet, or the like. As depicted in FIG. 5a and, the biasing mechanism 533 is a spring, while as depicted in FIG. 5c, the biasing mechanism 533 is a magnet. The biasing mechanism 533 may be structured to maintain the release mechanism 522 in a non-actuated configuration. As depicted in FIG. 6, the biasing mechanism may be structured to maintain the cables 634 connecting the release mechanism 622 to the locking member 612 in a configuration that maintains the locking member 612 in the outwardly extending locking orientation. The biasing mechanism may be overcome by actuation of the release mechanism 622.

The locking member 112 may be part of the locking assembly. The locking assembly may include a release mechanism 122 that allows the locking member 112 to be temporarily disposed into an inwardly retracted release orientation. The locking assembly may also include the locking member 112 and cables to connect the locking member 112 and the release mechanism 122. The release mechanism 122 may be actuated to overcome the nominal force of the biasing mechanism that maintains the locking member 112 in the outwardly extending locking orientation. The inwardly retracted release orientation of the locking member 112 may be maintained only while the release mechanism 122 is actuated. Disposing the locking member 112 into the inwardly retracted release orientation may allow the top portion 101 to be separated from the bottom portion 102. The release mechanism 122 may be disposed on the top portion 101 or the bottom portion 102. The release mechanism 122 may be actuated by rotating, pushing, pulling, sliding, or the like. The release mechanism may be located anywhere on the pet crate 100. In a preferred embodiment, the release mechanism 122 may be located on the same portion as the locking member 112. In a preferred embodiment, the release mechanism 122 may be located on a right wall, a left wall, or the top roof wall. In a preferred embodiment, there may be a plurality of release mechanisms 122 used to move a plurality of locking members 112.

The upper flange 111 and the lower flange 121 may be structured to temporarily dispose the locking member 112 into the inwardly retracted release orientation when the top portion 101 and the bottom portion 102 are initially positioned into the aligned orientation. The weight of the top portion 101 and the configuration of the upper flange 111, lower flange 121, or locking member 112 may cause the locking member 112 to overcome the nominal force of the biasing mechanism and temporarily dispose the locking member 112 into the inwardly retracted release orientation when the top portion 101 is placed atop the bottom portion 102. The temporary disposition of the locking member 112 into the inwardly retracted release orientation may allow the top portion 101 and the bottom portion 102 to mate securely and automatically when they are positioned in the aligned orientation. Furthermore, features on the top portion 101 or the bottom portion 102 may force the two portions into an aligned orientation when the top portion 101 is placed atop the bottom portion 102.

In one embodiment of the pet crate 100, the top portion 101 or bottom portion 102 may utilize a dual wall construction. The entire top portion 101 or bottom portion 102 may be a doubled-wall construction. In an alternate embodiment, less than the entire top portion 101 or bottom portion 102 may be double-walled. Any combination of the top portion 101 and bottom portion 102 may be double-walled or single-walled.

In one embodiment of the pet crate, the release mechanism 122 and the locking member 112 may be located on the top portion 101. At least part of the top portion 101 may be double-walled. Cables connecting the release mechanism 122 to the locking member 112 may be located within the double-walled structure of the top portion 101. In one embodiment, the release mechanism 122 may be located on the top roof wall 103 and a plurality of locking members 112 may be located on the top right wall 104 and the top left wall 105. In this embodiment, a plurality of cables may connect the release mechanism 122 to the plurality of locking members 112. The plurality of cables may operate to move the plurality of locking members 112 into the inwardly retracted release orientation when the release mechanism 122 is actuated. The plurality of cable may operate to maintain the plurality of locking members 112 in the outwardly extending locking orientation when the release mechanism 122 is not actuated. The cables may connect to the release mechanism 122 and be located in the double-walled structure of the top roof wall 103. The cables may also be located in the double walled structure of the top right wall 104 and the top left wall 105. The cables may connect to the plurality of locking members 112 within the double-walled structure of the top right wall 104 and top left wall 105.

There may be a channel disposed within the top portion 101 or the bottom portion 102 to receive the cables. In a preferred embodiment, a channel may be located within the double-walled structure of the top portion 101 or bottom portion 102 to receive the cables.

In an alternate embodiment, the release mechanism 122 and the locking member 112 may be located in the top right wall. The lower top left wall edge 110 may be hingedly connected to the upper bottom left wall edge 120. The release mechanism 122 may connect to the locking member 112 by way of cables located on the top portion 101. The cables may, but are not required to be, inside a channel in the dual-walled construction of the top portion 101.

The above description of the arrangement of components may refer to placement of the components in specific portions or specific walls of the pet crate 100. Those skilled in the art will appreciate that references to placing those components in specific portions or walls are provided for example, clarity and illustration only. The components may alternately be placed in other portions or walls. The above description is merely illustrative of possible embodiments and is not limiting.

Channels may be disposed within the interior of the pet crate 100 to receive and secure a plurality of removable partitions 131. The channels may be recesses, grooves, dimples, or indentations disposed on the interior of the walls of the pet crate 100. In an alternate embodiment, the channels may be protuberances, blisters, or nubs disposed on the interior of the walls of the pet crate 100. In embodiments in which a removable partition 131 may be placed vertically within the pet crate 100, the channels on the top portion 101 may align with channels on the bottom portion 102 to surround and secure the removable partition 131. The perimeter of the removable partition 131 may have a structure opposing the channel disposed on the interior of the pet crate 100. The structure of the perimeter of the removable partition 131 may allow it to mate securely to the channel disposed within the interior walls of the pet crate 100. By way of example, and not as a limitation, the interior of the pet crate 100 may have a channel disposed on the interior walls. The channel may be a continuous recess vertically encircling the interior of the pet crate 100. The perimeter of the removable partition 131 may be structured to fit securely within the recess provided by the channel. The removable partition 131 may be placed in the bottom portion 102. The top portion 101 may then be mated to the bottom portion 102 resulting in securely capturing the removable partition 131 between the portions.

A removable partition 131 may be disposed vertically or horizontally between the top portion 101 and the bottom portion 102. The removable partition 131 may be structured to engage with the top portion 101 or the bottom portion 102. The removable partition 131 may engage with the top portion 101 or the bottom portion 102 by way of a post that extends into the top portion 101 or the bottom portion 102. In a preferred embodiment, the inner surface of the top portion 101 or the bottom portion 102 may have a recessed ridge. The removable partition 131 may be structured to be placed in and secured by this ridge to assist in easy and secure assembly of the apparatus. The removable partition 131 may include a door to allow access through the removable partition 131. The top portion 101 or the bottom portion 102 may include a mechanism for securing a plurality of removable partitions 131 or for securing a removable partition 131 in multiple locations. The removable partition 131 may be any of a number of panels including doors, framed wire, solid panels, or the like. The removable partition 131 may be removed and substituted with an alternate removable partition 131 to suit the needs of the pet owner. A release mechanism cover 133 may be attachable to the apparatus to prevent engagement of the release mechanism 122. The release mechanism cover 133 may physically block access to the release mechanism 122. Additionally, the release mechanism cover 133 may be structured to prevent the release mechanism 122 from disposing the locking member 112 into an inwardly retracted release orientation. The release mechanism cover 133 may be permanently attached to the pet crate 100 or may be removable from the pet crate 100. In a preferred embodiment, the release mechanism cover 133 may be permanently attached to the pet crate 100 and may slide across or above the release mechanism 122 to prevent actuation of the release mechanism 122. The release mechanism cover 133 may be secured in place by a lock, friction, retaining member or the like. The release mechanism cover 133 may be secured in a configuration either preventing or allowing actuation of the release mechanism 122.

Figure 2:
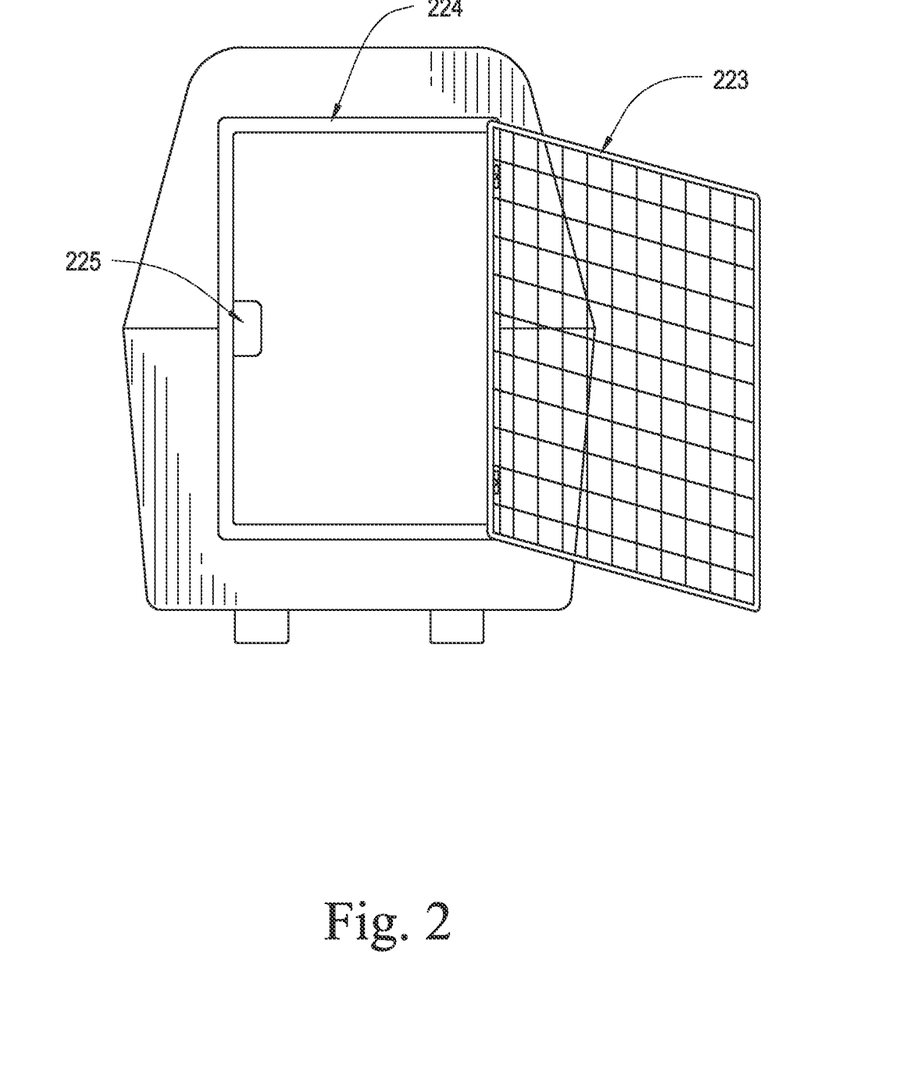
FIG. 2 depicts a possible embodiment of a modular door.
Figure 3:
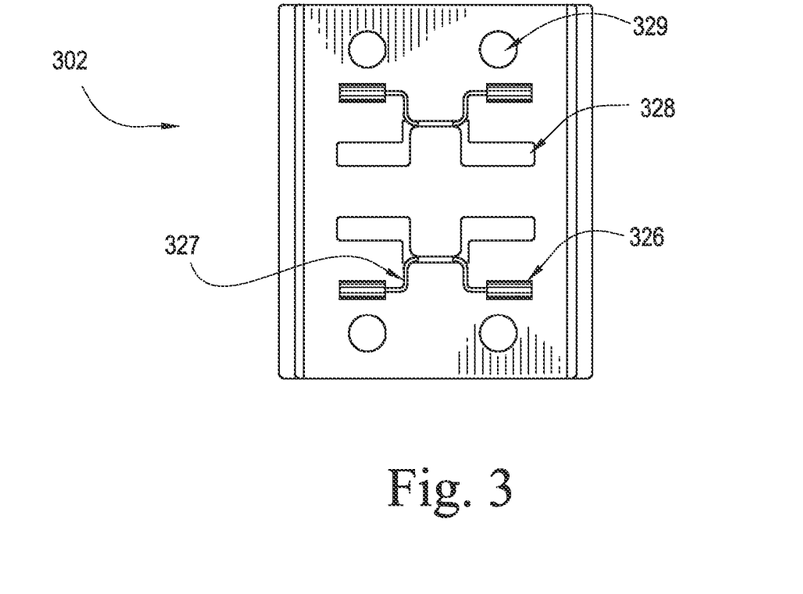
FIG. 3 depicts a bottom view of a possible embodiment of the bottom portion.

As depicted in FIG. 2, a modular door 223 may be disposed within the top portion forward opening and the bottom portion forward opening. In alternate embodiments, the modular door 223 may be disposed within any wall of the pet crate 100. The modular door 223 may be disposed entirely within the top portion 101, the bottom portion 102, or any combination of the two portions. In preferred embodiments, there may be a plurality of modular doors 223. The plurality of modular doors 223 may be disposed within the top roof wall 103, left wall, rear wall, forward wall, right wall, or bottom floor wall 113. The modular door 223 may be hung within a door frame 224. The door frame 224 may be structured to engage with the top portion and the bottom portion. The door frame 224 may engage with the top portion or the bottom portion by way of a post that extends into the top portion or the bottom portion. The door frame 224 may be secured to the pet crate 100 in the same way that removable partitions 131 are secured to the pet crate 100. The door frame 224 may be secured to the pet crate 100 using channels. In a preferred embodiment, the top portion or the bottom portion may have a recessed ridge along their respective forward openings. The door frame 224 may be structured to be placed in and secured by this ridge to assist in easy assembly of the apparatus. The door frame 224 may have a doorstop 225 disposed thereon. The doorstop 225 may be disposed on the door frame 224 to prevent the modular door 223 from swinging past the doorstop 225. The modular door 223 may be metal or plastic. Upon contact between the modular door 223 and the door frame 224, the modular door 223 may automatically secure to the door frame 224 and be prevented from opening. FIG. 3 depicts the underside of the bottom portion of the apparatus. A retractable wheel 326 may be disposed on the underside of the apparatus. The retractable wheel 326 may be capable of being placed in a stationary configuration, which allows the apparatus to be placed securely on the floor without engaging the retractable wheel 326. Additionally, the retractable wheel 326 may be capable of being placed in a movable configuration, which allows the apparatus to be rolled along the ground. In a preferred embodiment, the retractable wheel 326 may be rotatably connected to an axle 327. The axle 327 may be pivotably connected to the bottom portion 302. When the retractable wheel 326 is in the stationary configuration, the axle 327 may be rotated to a position in which the retractable wheel 326 lies within a wheel recess 328 and stores the entire retractable wheel 326 recessed above the lower most bottom surface of the bottom portion 302. The retractable wheel 326 may be placed in the movable configuration by rotating the axle 327 to a position in which at least a portion of the retractable wheel 326 lies below the lower most bottom surface of the bottom portion 302. In this movable configuration, the retractable wheel 326 will engage with the surface upon which the apparatus is placed and allow the apparatus to roll. Those skilled in the art will understand that this is merely exemplary of one possible retractable wheel 326 configuration. Other known retractable wheel 326 configurations are contemplated and disclosed by this application, including spring-loaded retractable wheels.

A bottom floor protuberance 329 may be located on the underside of the bottom portion 302. In a configuration containing both a bottom floor protuberance 329 and a retractable wheel 326, the entire retractable wheel 326 must be positioned above the bottom surface of the bottom floor protuberance 329 when in the stationary configuration. Likewise, at least a portion of the retractable wheel 326 must be positioned below the bottom surface of the bottom floor protuberance 329 when in the movable configuration. The bottom floor protuberance 329 may be structured to fits securely into a top roof recess 130. The top roof recess 130 may be located in the top roof wall 103 of the top portion 101. The bottom floor protuberance 329 may be structured to engage with the top roof recess 130 when multiple apparatus are stacked atop one another. The structure of the bottom floor protuberance 329 and the top roof recess 130 may secure the apparatus to one another in a stacked configuration and prevent stacked apparatus from falling.

Figure 4:
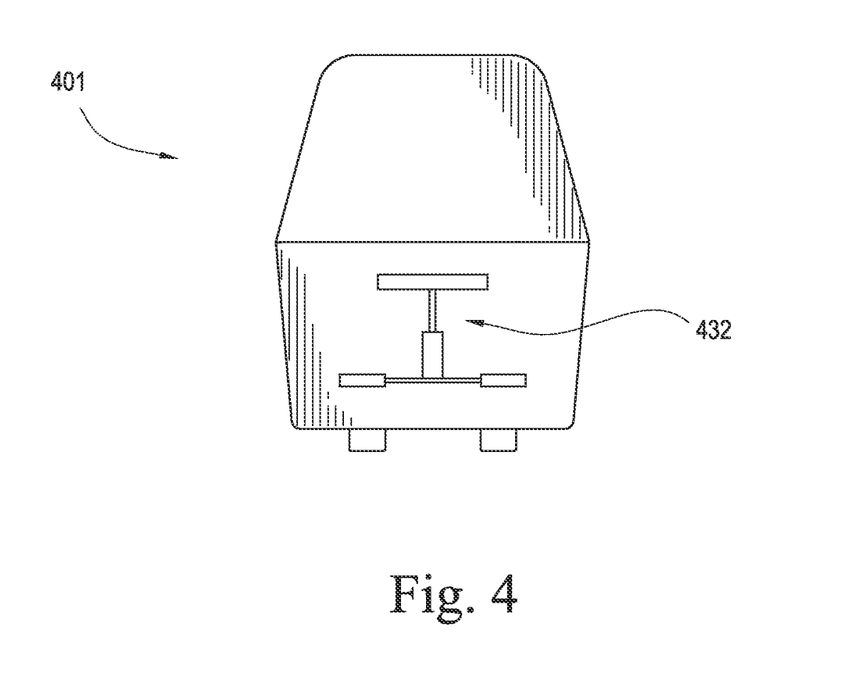
FIG. 4 depicts an end view of a possible embodiment of the apparatus.

The apparatus may further include a handle 432. The handle 432 may be disposed in the top surface of the top portion 401 and may be used to lift the apparatus. In a preferred embodiment, the handle 432 may be disposed on a vertical wall. The handle 432 may be capable of being placed in a retracted configuration in which the handle 432 is collapsed to less than its maximum length to facilitate storage. The handle 432 may also be capable of being positioned into an extended configuration in which the handle 432 may be expanded to its maximum length to facilitate pulling or pushing the pet crate. In a preferred embodiment, the handle 432 may have a telescoping construction that allows the handle 432 to be compactly stored when not in use and extended when in use. The handle 432 may be hingedly connected to the apparatus to allow the handle 432 to lie parallel to the adjoining surface of the apparatus when the handle 432 is not in use or to be positioned at an angle to the adjoining surface of the pet crate when the handle 432 is being utilized. Those skilled in the art will understand that this is merely exemplary of one possible handle 432 configuration. Other known handle 432 configurations are contemplated and disclosed by this application.

While not depicted in a drawing, the apparatus may also include other useful features. By way of example, but not as a limitation, additional features that may be included on the apparatus include a device for recording and playing back sound, a structure for securing a litter box in the bottom portion, containment areas for heating or cooling packs, structure allowing food or water containment systems to be secured to the apparatus, food or water containment systems that can be replenished without accessing the interior of the housing, structure enabling the apparatus to be secured or tied down, or a GPS device.

While the above description generally refers to the location of different components in the top portion 101, the bottom portion 102, or specific walls of either portion, one skilled in the art understands that the location of parts on either portion or alternate walls is contemplated and disclosed in this application.

While the above description contains much specificity, these should not be construed as limitations on the scope of any embodiment, but as exemplifications of the presently preferred embodiments thereof. Many other ramifications and variations are possible within the teachings of the various embodiments.

Thus the scope of the invention should be determined by the appended claims and their legal equivalents, and not by the examples given.

What is claimed is:

1. An apparatus for housing an animal comprising:
a top portion comprising a top roof wall, a top right wall, a top left wall, a top rear wall, and a top forward wall having a top portion forward opening formed therein;
wherein the top right wall comprises a lower top right wall edge, having a top right wall length;
wherein the top left wall comprises a lower top left wall edge, having a top left wall length;
wherein an upper flange is disposed along the lower top right wall edge and the lower top left wall edge;
a first locking member, movably mounted to the upper flange and movable along the top right wall length;
a second locking member, movably mounted to the upper flange and movable along the top left wall length;
a bottom portion comprising a bottom floor wall, a bottom right wall, a bottom left wall, a bottom rear wall, and a bottom forward wall having a bottom portion forward opening formed therein; wherein the bottom right wall comprises an upper bottom right wall edge; wherein the bottom left wall comprises an upper bottom left wall edge; wherein a lower flange is disposed along the upper bottom right wall edge and the upper bottom left wall edge; and wherein the first and second locking members engage with the lower flange when the first and second locking members are in an outwardly extending locking orientation; and wherein the top portion and the bottom portion are cooperatively structured to assume an aligned orientation;
a locking assembly structured to retain the top portion and the bottom portion in the aligned orientation, wherein the locking assembly comprises the first and second locking members wherein the outwardly extending locking orientation is at least partially defined by the first and second locking members structured to engage at least a portion of the lower flange in an abutting relation to prevent detachment of the bottom portion from the top portion while disposed in the outwardly extending locking orientation;
a release mechanism movably affixed to the top portion and mechanically connected to both the first and second locking members, structured to permit both the first and second locking members to be temporarily disposed into an inwardly retracted release orientation upon actuation of the release mechanism; and
a biasing mechanism connected to the release mechanism, structured to normally dispose and maintain both the first and second locking members in the outwardly extending locking orientation;
wherein the upper flange and the lower flange are structured to temporarily dispose both the first and second locking members into the inwardly retracted release orientation when the top portion and the bottom portion are initially positioned into the aligned orientation.

2. The apparatus as recited in claim 1 wherein the biasing mechanism further comprises a spring.

3. The apparatus as recited in claim 1 further comprising a modular door; wherein the modular door is positioned within the top portion forward opening and the bottom portion forward opening.

4. The apparatus as recited in claim 3 further comprising a door frame; wherein the door frame mates fixedly to the upper flange and the lower flange; and wherein the modular door is movable within the door frame.

5. The apparatus as recited in claim 4 further comprising a doorstop attached to the door frame wherein the doorstop prevents the modular door from moving past the doorstop.

6. The apparatus as recited in claim 1 further comprising a retractable wheel attached to the bottom portion, wherein the retractable wheel may be positioned in a stationary configuration or a movable configuration.

7. The apparatus as recited in claim 1 further comprising a handle wherein the handle may be positioned in a retracted configuration or an extended configuration.

8. The apparatus as recited in claim 1 further comprising a removable partition extending perpendicularly between the top roof wall and the bottom floor wall.

9. The apparatus as recited in claim 1 further comprising a release mechanism cover removably attached to the top portion wherein the release mechanism cover prevents the disposition of the first and second locking members into the inwardly retracted release orientation.

10. The apparatus as recited in claim 1 wherein the top roof wall further comprises a top roof recess and the bottom floor wall further comprises a bottom floor protuberance and wherein the bottom floor protuberance fits securely inside the top roof recess when one apparatus is stacked atop another apparatus.

11. The apparatus as recited in claim 1 further comprising a device for recording and playing back sound.

12. The apparatus as recited in claim 1 further comprising a GPS device.

13. The apparatus according to claim 1 further comprising:
a first cable with a first end mechanically coupled to the release mechanism and a second end mechanically coupled to the first locking member; and
a second cable with a third end mechanically coupled to the release mechanism and a fourth end mechanically coupled to the second locking member.

14. The apparatus according to claim 13 wherein the release mechanism is rotatably connected to the top portion.

15. The apparatus as recited in claim 13 wherein the biasing mechanism further comprises a spring.

16. The apparatus as recited in claim 1 wherein the biasing mechanism further comprises a magnet.

17. The apparatus as recited in claim 13 wherein the biasing mechanism further comprises a magnet.

18. The apparatus as recited in claim 1 wherein the release mechanism is rotatably connected to the top portion.

* * * * *